No. 10,283. PATENTED NOV. 29, 1853.
J. CRABTREE & J. HOPKINSON.
MODE OF PACKING STEAM AND OTHER ENGINES AND PUMPS.

UNITED STATES PATENT OFFICE.

JNO. CRABTREE AND JOS. HOPKINSON, OF PHILADELPHIA, PENNSYLVANIA.

TIGHTENING PACKING OF ENGINE AND PUMP PISTONS.

Specification of Letters Patent No. 10,283, dated November 29, 1853.

*To all whom it may concern:*

Be it known that we, JOHN CRABTREE and JOSEPH HOPKINSON, both of the city and county of Philadelphia and State of Pennsylvania, have invented a new and Improved Mode of Packing Steam and other Engines and Pumps; and we do hereby declare that the following is a full, clear, and exact description of the construction and operation of the same, reference being had to the annexed drawings, making a part of this specification, in which—

Figure 1:
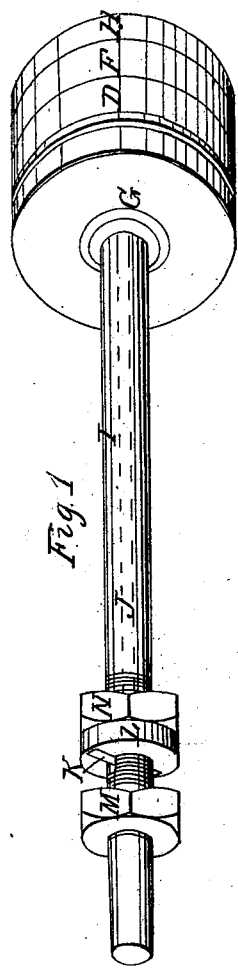
Figure 2:
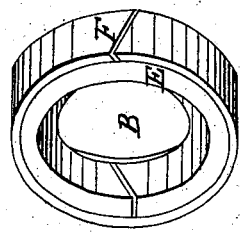
Figure 2:
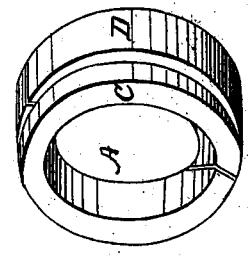

Figure 1 is a perspective view. Fig. 2 is a perspective view of the metallic conical ring packing.

Our invention consists in a peculiar mode of tightening the packing of pistons of steam and other engines and pumps, whereby the necessity of removing the cylinder head or follower for the purpose of adjusting or tightening the packing, is entirely obviated.

Our packing is composed of two pairs of conical rings (A, B), each pair consisting of two rings, an inner and outer ring (C, D, E, F). The external beveled or conical surfaces of the inner rings (C, E), are in contact with the internal beveled or conical surfaces of the outer rings (D, F). The external surfaces of the outer rings are concentric with the cylinder, being in contact and forming a steam joint with the cylinder. The slots in the rings are placed directly opposite each other as is ordinarily done to prevent the escape of steam. The inner ring (C) adjoining the piston head (G) projects or extends beyond the outer ring (D) to which it is paired, (or that with whose conical surface it is in contact) as much as the outer ring (F) adjoining the follower (H) projects or extends beyond the inner ring (E) to which it is paired, or with whose conical surface it is in contact. The inner edges of all the rings are flush when not set out, so that when brought together they are in contact throughout their entire surface. Consequently when the ring (C) adjoining the piston head is pressed inward, (by forcing in the follower by means hereafter to be described), its inner edge will press against the ring (E) contained within that next the follower, by which operation both the external or outer rings, (or those in contact with the cylinder), will be driven outward, making a tighter steam joint. The same result may be produced by placing the projecting ring next to the follower thus merely reversing the position of the packing. The means by which the packing is adjusted is as follows: The piston rod (I) is hollow, and contains a rod (J), whose inner extremity is attached to the follower. A groove is cut through its outer extremity near the cross head, into which and a corresponding groove cut through the piston rod, a key (K) is inserted. This key projects a little beyond or outside of the piston rod, and is received into a groove in a collar (L) which moves freely on the piston rod, and which when forced against the key by a set nut (N), (working on a screw cut on the piston rod), draws the follower against the adjoining ring, (or that with which it is in contact), by which the other rings are simultaneously and uniformly acted upon, being forced in an outward direction.

Should the packing be too tightly set out it is relieved by simply turning the set nut, which relaxes the follower and allows the rings to spring inward. Having adjusted the packing to any desired point, a jam nut (M) is screwed up against the collar, which renders the entire arrangement firm and secure, preventing any derangement of the rings. This packing being of a springy nature, will adapt itself to any slight inequality that may exist in the cylinder, thereby saving a large amount of steam and increasing the efficiency of the engine. As the packing is adjusted by merely turning the set nut with a wrench or other suitable means, it is evident that it will be unnecessary to remove the cylinder head or follower, thus effecting the object by a more simple, accurate, and efficacious method than by any heretofore used. This packing can also be used to advantage in combination with the stuffing box of engines and pumps. One prominent feature of this packing is, that it is entirely free from screws, nuts, lips, or any other appendage, which from their liability to corrode, constitute a serious objection to those modes of packing in which they have been combined. Another important advantage connected with this packing, and the arrangement by which it is adjusted is, the ease, rapidity, and mathematical certainty with which it is effected, an operation so simple that it can be done by one who would be utterly incompetent properly to adjust other packing.

We are aware that various methods of packing with elastic metallic rings have been used and that the conical form is well known, and also that the adjustment of packing by a single turn of a wrench or other equivalent, without the necessity of disturbing the piston or follower is not new. Yet these arrangements from their intricacy and consequent liability to become deranged present many practical difficulties.

What we therefore claim as our invention, and desire to secure by Letters Patent, is—

Tightening the packing of the piston, by the rod passed down through the hollow piston rod and attached to follower; the nut; key; and hollow piston rod combined and operating substantially as described in the specification.

JOHN CRABTREE.

JOSEPH $\overset{\text{his}}{\times}$ HOPKINSON.
$\quad\quad\quad$ mark

Witnesses:
JOHN T. CLEMENS,
ARMON DAVIS.